(12) United States Patent
Cheng et al.

(10) Patent No.: US 7,599,132 B1
(45) Date of Patent: Oct. 6, 2009

(54) WIDE-ANGLE LENS SYSTEM

(75) Inventors: Ting-Yu Cheng, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/195,443

(22) Filed: Aug. 21, 2008

(30) Foreign Application Priority Data

Jun. 16, 2008 (CN) .......................... 2008 1 0302158

(51) Int. Cl.
*G02B 9/04* (2006.01)
(52) U.S. Cl. ...................................... 359/793
(58) Field of Classification Search ................ 359/793, 359/782, 783, 691
See application file for complete search history.

(56) References Cited

U.S. PATENT DOCUMENTS

| | | | | |
|---|---|---|---|---|
| 5,071,235 A | * | 12/1991 | Mori et al. | 359/692 |
| 6,295,508 B1 | * | 9/2001 | Trammell et al. | 702/107 |
| 6,583,939 B2 | * | 6/2003 | Yoshikawa et al. | 359/673 |
| 2004/0179276 A1 | * | 9/2004 | Yamakawa | 359/793 |

* cited by examiner

*Primary Examiner*—Timothy J Thompson
(74) *Attorney, Agent, or Firm*—Zhigang Ma

(57) ABSTRACT

An exemplary wide-angle lens system includes, in order from the object side to the image side thereof, a first lens element having a negative optical power and crescent-shaped convex to the object side and a second lens element having a positive optical power. The first and second lens elements are plastic, and the wide-angle lens system satisfies the conditions R1F/R1R>1.24, and R2F/R2R>3.28, where R1F is the radius of curvature of an object-side surface of the first lens element, R1R is the radius of curvature of an image-side surface of the first lens element, R2F is the radius of curvature of an object-side surface of the second lens element, and R2R is the radius of curvature of an image-side surface of the second lens element.

14 Claims, 7 Drawing Sheets

WIDE-ANGLE LENS SYSTEM

BACKGROUND

1. Technical Field

The invention relates to a wide-angle lens system and, more particularly, to a low-cost compact wide-angle lens system of plastic.

2. Description of the Related Art

In general, the current trends toward wide-angle lenses advocate for lens systems with a wide field angle thereof to receive a broader view while achieving small aberrations (e.g., lateral color aberration) to form a quality image onto solid state imaging elements such as coupled charge device (CCD) image sensors or complementary metal oxide semiconductor (CMOS) imaging sensors. However, reduction of these aberrations, especially field curvature, distortion, and spherical aberration, becomes a challenge when configuring a wide-angle lens having a large field angle, especially when the technologies in configuration of the wide-angle lens, such as the number of lenses and the refraction power distribution of the lenses employed have yet to mature.

Therefore, it is desirable to provide a wide-angle lens system which can overcome the limitations described.

SUMMARY

An exemplary wide-angle lens system includes, in the order from the object side to the image side thereof, a first lens element having a negative optical power and crescent-shaped convex to the object side and a second lens element having a positive optical power. The first and second lens elements are plastic, and the wide-angle lens system satisfies the conditions R1F/R1R>1.24, and R2F/R2R>3.28, where R1F is the radius of curvature of an object-side surface of the first lens element, R1R is the radius of curvature of an image-side surface of the first lens element, R2F is the radius of curvature of an object-side surface of the second lens element, and R2R is the radius of curvature of an image-side surface of the second lens element.

BRIEF DESCRIPTION OF THE DRAWINGS

Many aspects of the present wide-angle lens system should be better understood with reference to the following drawings. The components in the drawings are not necessarily drawn to scale, the emphasis instead being placed upon clearly illustrating the principles of the present wide-angle lens system. Moreover, in the drawings, like reference numerals designate corresponding parts throughout the several views.

DETAILED DESCRIPTION OF EMBODIMENTS

Embodiments of the present wide-angle lens system will now be described in detail with reference to the drawings.

Figure 1:
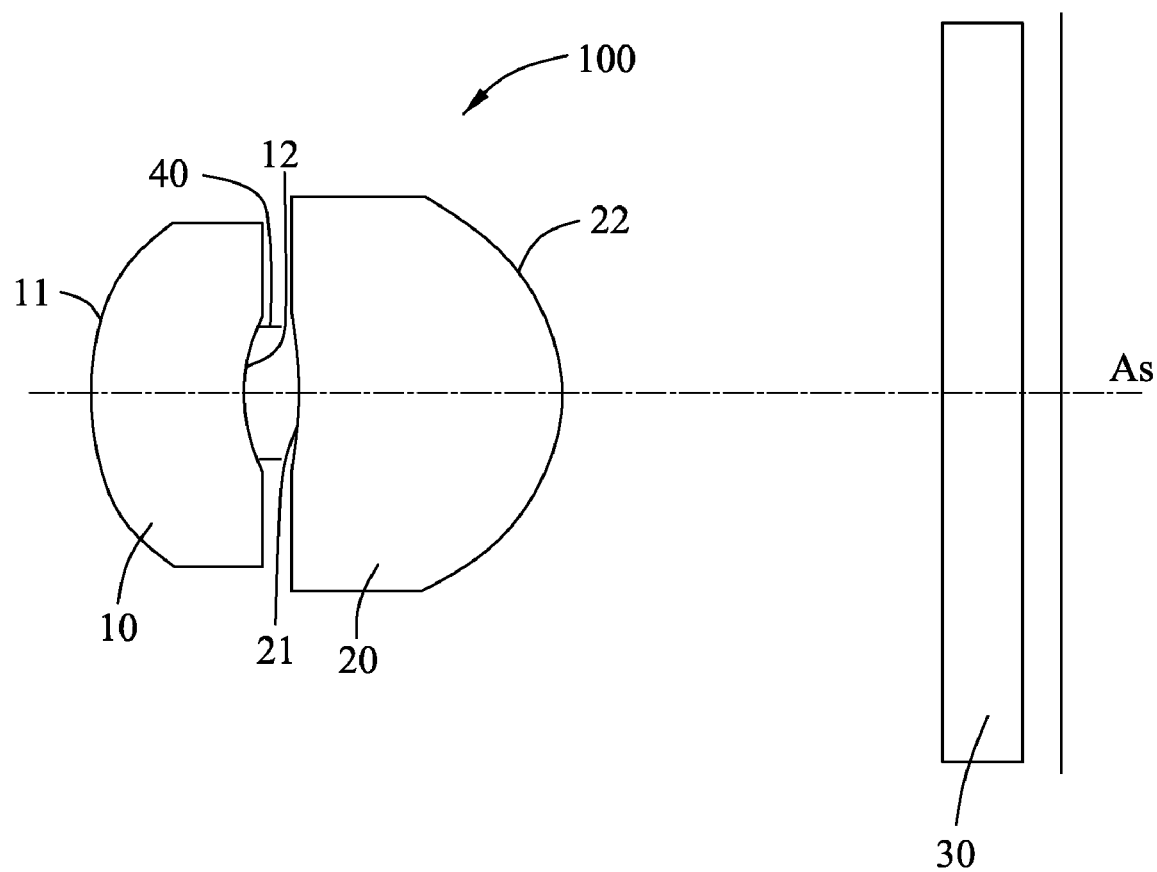
FIG. 1 is a schematic, lens construction diagram of a wide-angle lens system.

Referring to FIG. 1, a wide-angle lens system 100 includes, in the order from the object side to the image side thereof, a first element 10, a second element 20 and an aperture stop 40 on an optical axis As. During image capture, light is transmitted through the first element 10, the aperture stop 40 and the second element 20 to register on the image sensor 30, which may be a Charge Coupled Device (CCD) or Complementary Metal Oxide Semiconductor (CMOS).

The first lens element 10 is crescent-shaped and has a negative optical power convex to the object side. The first lens element 10 has an object-side surface 11, and a non-spherical image-side surface 12 thereof. The object-side surface 11 faces the object side and the image-side surface 12 faces the second lens element 20. Furthermore, in this embodiment, the first lens element 10 is plastic.

The second lens element 20 is crescent-shaped and has a positive optical power convex to the image sensor 30. The second lens element 20 has an object-side surface 21, a non-spherical image-side surface 22 thereof. The object-side surface 21 faces the image-side surface 12 of the first lens element 10 and the image-side surface 22 faces the image sensor 30. In this embodiment, the second lens element 20 is plastic.

The aperture stop 40 is positioned between the first lens element 10 and the second lens element 20 to reduce light flux into the second lens 20. For further cost reduction, the aperture stop 40 is formed directly on the image-side surface 12 of the first lens element 10 facing the second lens element 20.

As regards conditional formulae to be satisfied by the wide-angle lens system of each embodiment, it is to be noted that not all formulae described need be satisfied at a time, such that corresponding mechanism and effect can be achieved by separately satisfying individual conditional formulae in accordance with optical construction. From viewpoints of optical performance, downsizing, assembly and the like, it is obviously preferable that a plurality of conditional formulae be satisfied.

Conditional Formula A:

$$R1F/R1R > 1.24 \quad\quad\quad A$$

where

R1F represents the radius of curvature of the object-side surface 11 of the first lens element 10; and R1R represents the radius of curvature of the image-side surface 12 of the first lens element 10.

The conditional formula A for the first lens element 10 defines the condition for control of the angle of view.

Conditional Formula B:

$$R2F/R2R > 3.28 \quad \text{B}$$

where

R2F represents the radius of curvature of the object-side surface 21 of the second lens element 20; and R2R represents the radius of curvature of the image-side surface 22 of the second lens element 20.

The conditional formula B for the second lens element 20 defines the condition for applying the angle of view. If the conditional formula A and conditional formula B are not satisfied, wide-range image capture cannot be completely accomplished.

Conditional Formula C:

$$v1 < v2 (v1 < 30) \quad \text{C}$$

where v1 represents the Abbe number of the first lens element 10; and v2 represents the Abbe number of the second lens element 20.

Conditional formula C defines the condition for balancing lateral color.

While examples of the system 100 are described below with reference to FIGS. 2-7, it is to be understood that the invention is not limited thereto. The following symbols are represented in each exemplary embodiment.

f: focal length of the lens system 100
$2\omega$: field angle
R: radius of curvature
d: distance between surfaces on the optical axis of the system
Nd: refractive index of lens
v: Abbe number In each example, the first lens element 10 and second lens element 20 are non-spherical. The shape of each non-spherical surface is provided by expression 1 as follows. Expression 1 is based on a Cartesian coordinate system, with the vertex of the surface as the origin, and the optical axis extending from the vertex the x-axis. Expression 1:

$$x = \frac{ch^2}{1 + \sqrt{1 - (k+1)c^2 h^2}} + \sum A_i h^i$$

where h is a height from the optical axis to the surface;
c is a vertex curvature;
k is a conic constant; and $A_i$ is i-th order correction coefficient of the non-spherical surfaces.

Example 1

Tables 1 and 2 shows lens data of Example 1.

TABLE 1

| $2\omega = 77.48°$ | | $f = 2.02$ mm | | |
|---|---|---|---|---|
| Surface number | R (mm) | d (mm) | Nd | v |
| Surface 11 | 1.02 | 0.58 | 1.607 | 26.6 |
| Surface 12 | 0.82 | 0.10 | 1.607 | 26.6 |
| Surface 21 | −2.43 | 1.00 | 1.543 | 56.0 |
| Surface 22 | −0.74 | 1.45 | 1.543 | 56.0 |

TABLE 2

| Surface number | Surface 11 | Surface 12 | Surface 21 | Surface 22 |
|---|---|---|---|---|
| Non-spherical surface data | A4 = −0.0298 | A4 = −0.1141 | A4 = −1.6205 | A4 = 0.0384 |
| | A6 = 0.3708 | A6 = −7.0995 | A6 = 14.8928 | A6 = −0.4260 |
| | A8 = −2.3108 | A8 = 167.3479 | A8 = −116.9676 | A8 = 0.9210 |
| | A10 = 6.6077 | A10 = −2769.1948 | A10 = 655.7583 | A10 = −1.4256 |
| | A12 = −8.1.78 | A12 = 14724.2510 | A12 = −1490.1294 | A12 = 0.1730 |

Figure 2:
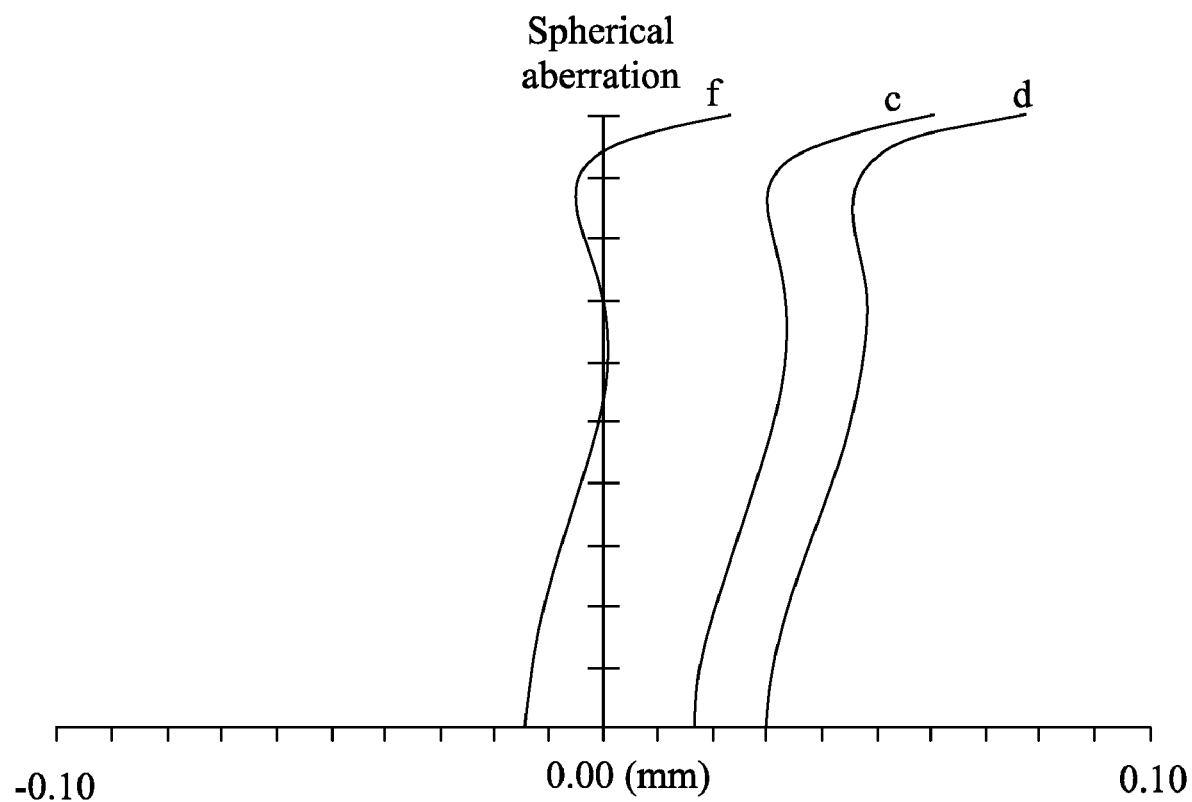
FIG. 2 is a spherical aberration diagram of a wide-angle lens system, according to a first exemplary embodiment.
Figure 3:
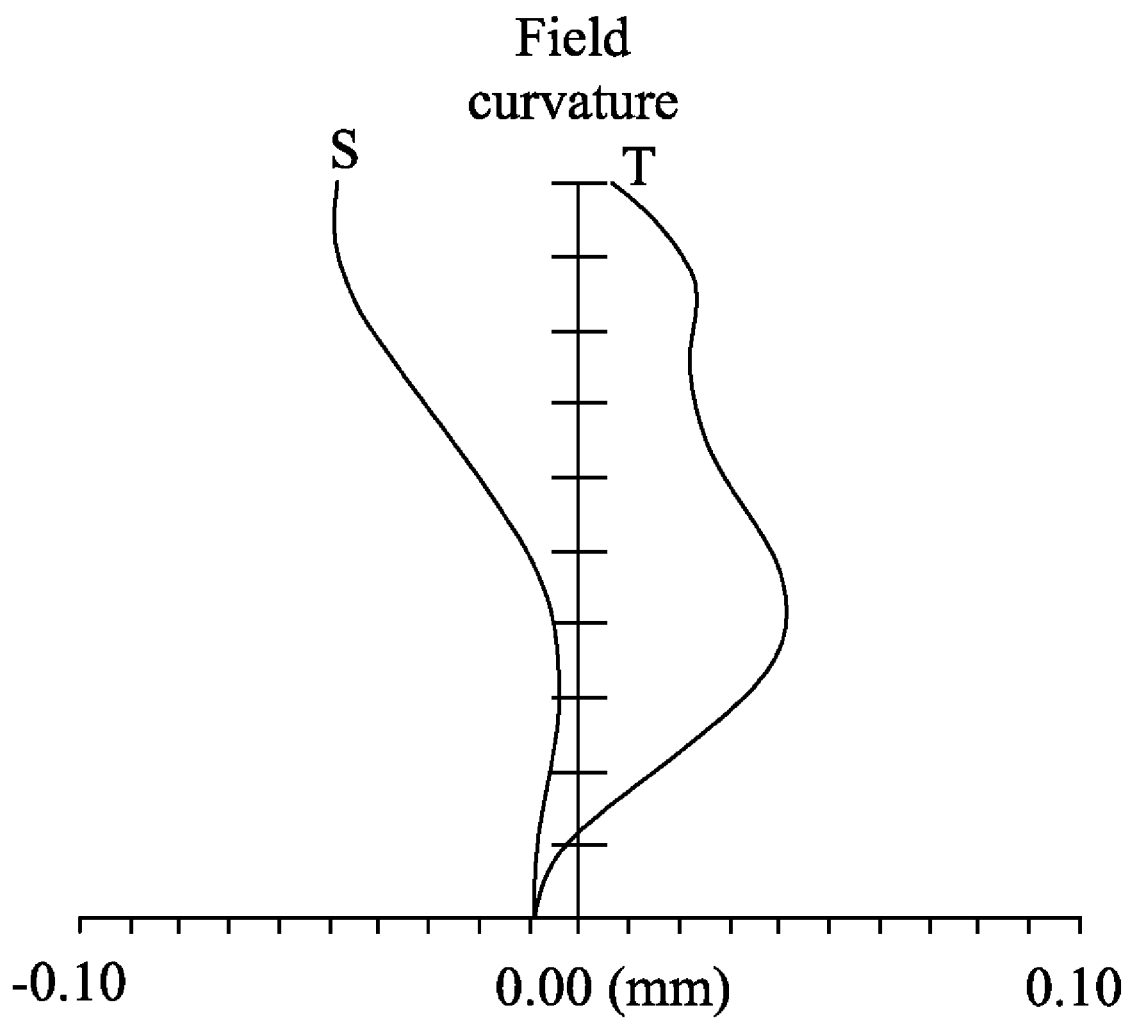
FIG. 3 is a field curvature diagram of the wide-angle lens system, according to the first exemplary embodiment.
Figure 4:
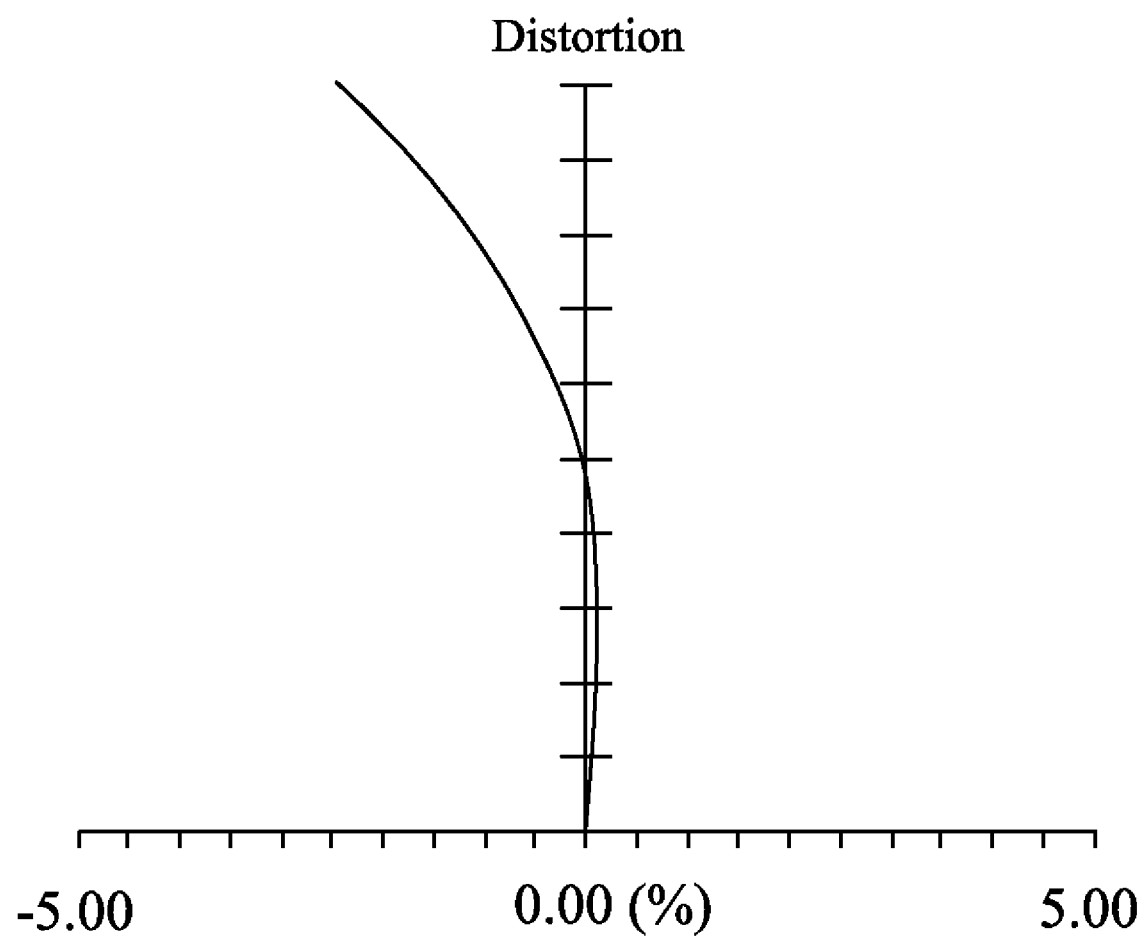
FIG. 4 is a distortion diagram of the wide-angle lens system, according to the first exemplary embodiment.

FIGS. 2 to 4 are aberration (spherical aberration, field curvature, and distortion) diagrams for a first embodiment. In the diagram of FIG. 2, the curves c, d, and f show spherical aberration of the lens system 100 corresponding to three types of light with wavelengths of 656.3 nm, 587.6 nm, and 435.8 nm, respectively. Furthermore, the spherical aberration value is from −0.10 mm to 0.10 mm. FIG. 3 shows a field curvature diagram related to field curvature value of sagittal surface and tangential surface. The field curvature values of sagittal surface and tangential surface are from −0.10 mm to 0.10 mm. FIG. 4 shows the distortion (in %) is from −5.0% to 0%.

Example 2

Tables 3 and 4 show lens data of Example 2.

TABLE 3

| $2\omega = 78.70°$ | | $f = 1.98$ mm | | |
|---|---|---|---|---|
| Surface number | R (mm) | d (mm) | Nd | v |
| Surface 11 | 1.04 | 0.55 | 1.61 | 26.60 |
| Surface 12 | 0.83 | 0.10 | 1.61 | 26.60 |
| Surface 21 | −2.47 | 1.01 | 1.54 | 56.00 |
| Surface 22 | −0.73 | 1.48 | 1.54 | 56.00 |

TABLE 4

| Surface number | Surface 11 | Surface 12 | Surface 21 | Surface 22 |
|---|---|---|---|---|
| Non-spherical surface data | A4 = −0.0128<br>A6 = 0.3420<br>A8 = −2.1781<br>A10 = 6.5732<br>A12 = −8.1346 | A4 = −0.1074<br>A6 = −6.4416<br>A8 = 166.4211<br>A10 = −2803.0289<br>A12 = 15315.8140 | A4 = −1.6119<br>A6 = 14.9407<br>A8 = −115.9756<br>A10 = 659.2069<br>A12 = −1540.6814 | A4 = 0.0300<br>A6 = −0.4378<br>A8 = 0.9136<br>A10 = −1.4634<br>A12 = 0.2326 |

Figure 5:
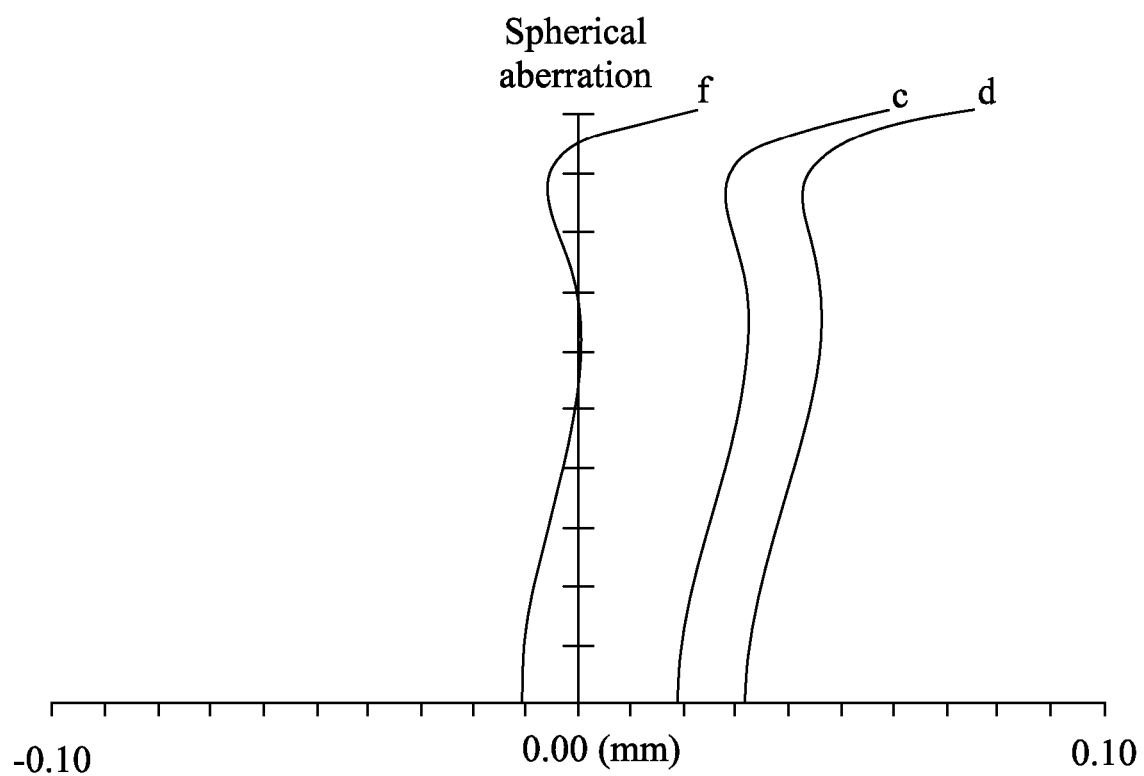
FIG. 5 is a spherical aberration diagram of a wide-angle lens system, according to a second exemplary embodiment.
Figure 6:
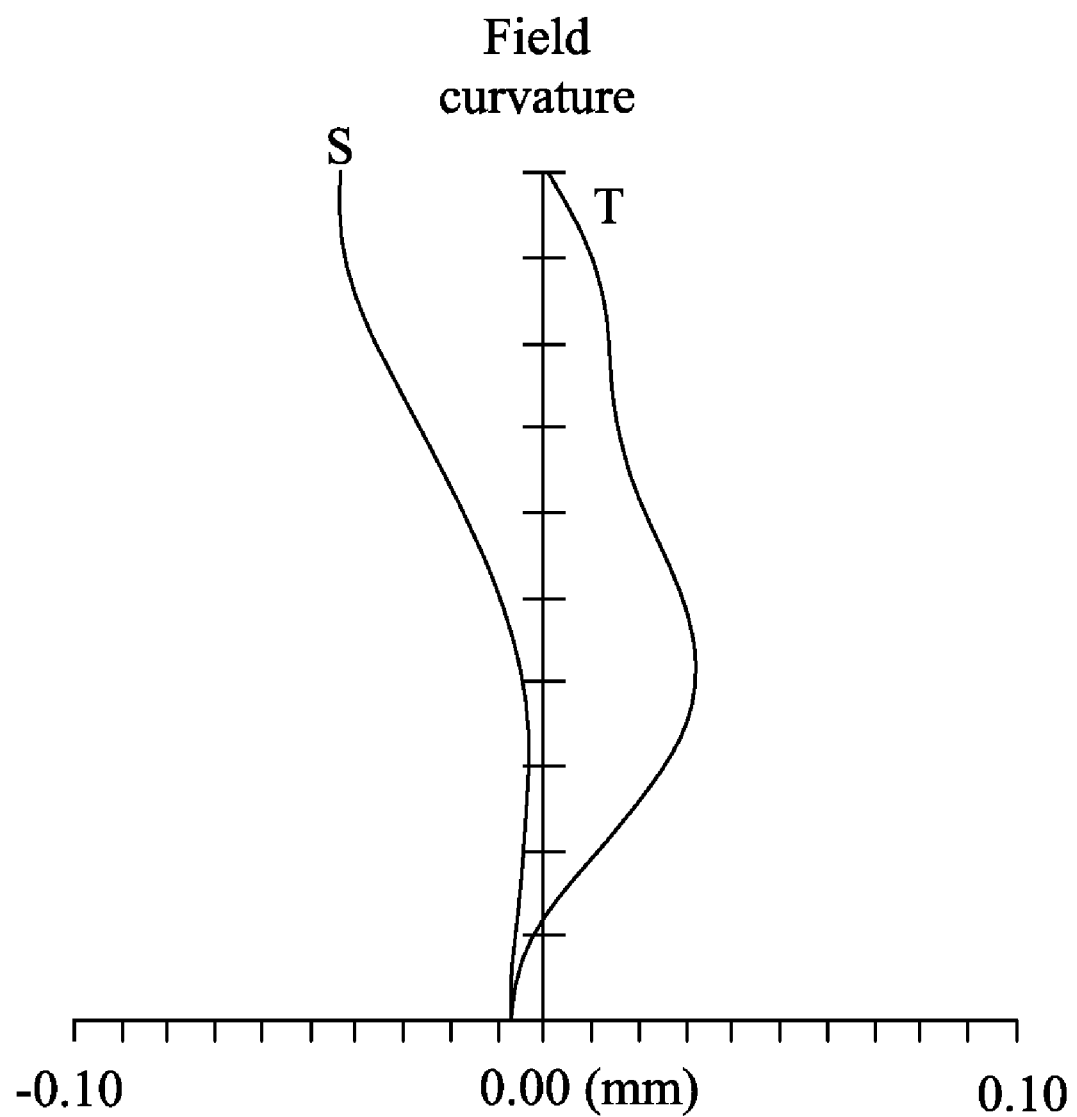
FIG. 6 is a field curvature diagram of the wide-angle lens system, according to the second exemplary embodiment.
Figure 7:
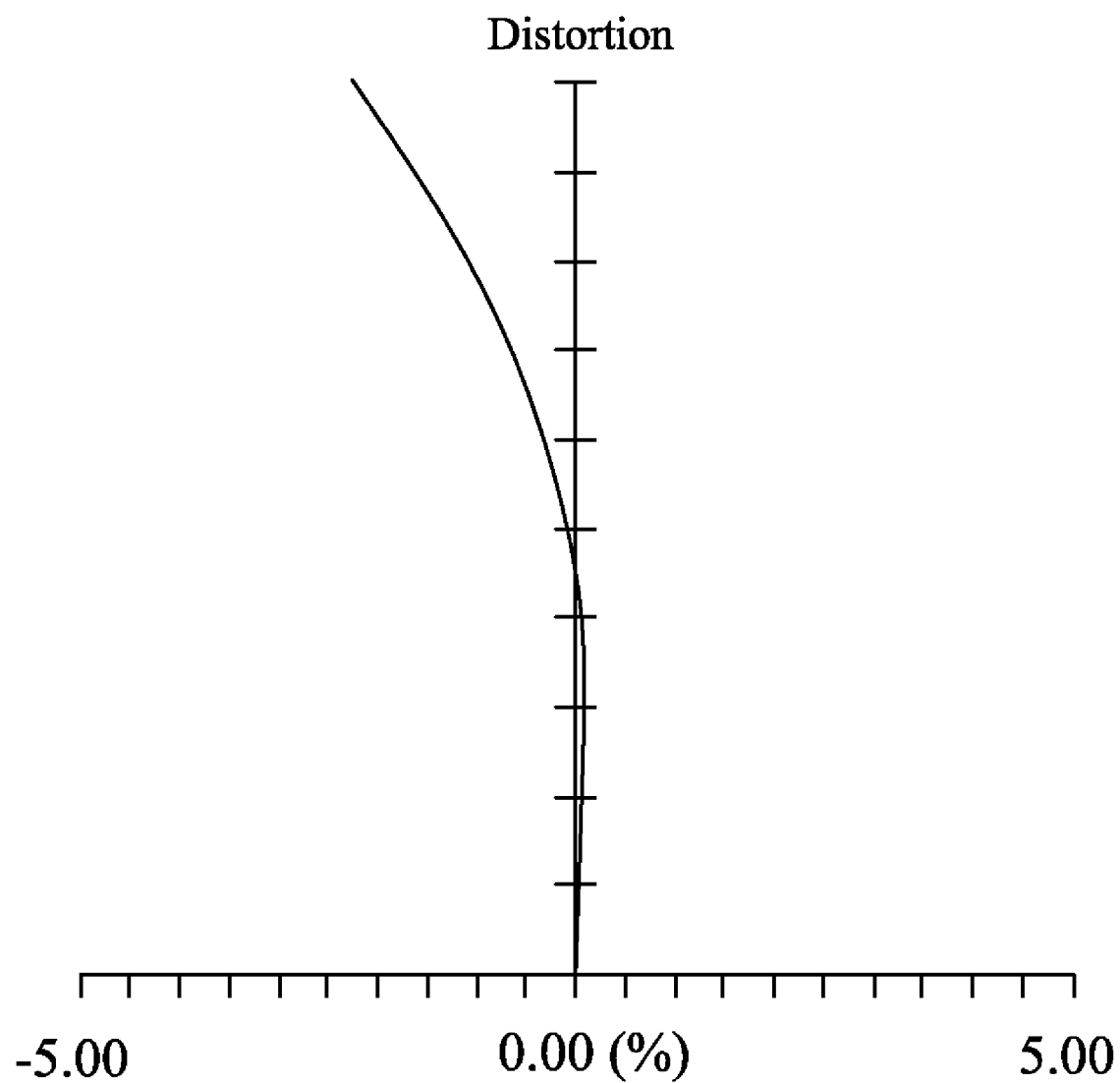
FIG. 7 is a distortion diagram of the wide-angle lens system, according to the second exemplary embodiment.

FIGS. 5 to 7 are aberration (spherical aberration, field curvature, and distortion) diagrams for a second embodiment. In the diagram of FIG. 5, curves c, d, and f show spherical aberration of the lens system 100 corresponding to three types of light with wavelengths of 656.3 nm, 587.6 nm, and 435.8 nm, respectively. Furthermore, the spherical aberration value (in mm) is from −0.05 mm to 0.05 mm. FIG. 6 is a field curvature diagram related to field curvature value (in mm) of sagittal surface and tangential surface. The field curvature values of sagittal surface and tangential surface are from −0.10 mm to 0.10 mm. FIG. 7 shows the distortion (in %) is from −5.0% to 0%.

As described, the wide-angle lens system 100 having the negative optical power lens 10 and the positive optical power lens 20 can reduce distortion to from −5% to 0% while maintaining the wide field angle of the wide-angle lens system beyond 70°, providing favorable optical performance with decreased yield cost.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A wide-angle lens system comprising, in order from the object side to the image side thereof with no intervening lenses:
a first lens element having a negative optical power convex to the object side; and
a second lens element having a positive optical power;
wherein the wide-angle lens system satisfies the following conditions:

$R1F/R1R > 1.24$;

$R2F/R2R > 3.28$;

$v1 < v2$ and $v1 < 30$;

wherein R1F is the radius of curvature of the object-side surface of the first lens element, R1R is the radius of curvature of the image-side surface of the first lens element, R2F is the radius of curvature of the object-side of the second lens element, R2R is the radius of curvature of the image-side surface of the second lens element, v1 is Abbe number of the first lens element and v2 is Abbe number of the second lens element.

2. The wide-angle lens system of claim 1, further comprising an aperture stop positioned between the first lens element and the second lens element.

3. The wide-angle lens system of claim 2, wherein the aperture stop is formed directly on the image-side surface of the first lens.

4. The wide-angle lens system of claim 1, wherein the first lens element and the second lens element are non-spherical.

5. The wide-angle lens system of claim 1, wherein the first lens element is a crescent-shaped lens convex to the object side.

6. The wide-angle lens system of claim 1, wherein the second lens element is a crescent-shaped lens convex to the image side.

7. The wide-angle lens system of claim 1, wherein the first lens element is made of plastic.

8. The wide-angle lens system of claim 1, wherein the second lens element is made of plastic.

9. A wide-angle lens system comprising, in the order from the object side to the image side:
a first lens element having a negative optical power convex to the object side;
an aperture stop formed on the first lens element; and
a second lens element having a positive optical power and facing the aperture stop of the first lens element;
wherein the wide-angle lens system satisfies the following conditions:

$R1F/R1R > 1.24$;

$R2F/R2R > 3.28$;

$v1 < v2$ and $v1 < 30$;

wherein R1F is the radius of curvature of the object-side surface of the first lens element, R1R is the radius of curvature of the image-side surface of the first lens element, R2F is the radius of curvature of the object-side surface of the second lens element, R2R is the radius of curvature of the image-side surface of the second lens element, v1 is Abbe number of the first lens element and v2 is Abbe number of the second lens element.

10. The lens system of claim 9, wherein the first lens element and the second lens element are non-spherical.

11. The wide-angle lens system of claim 9, wherein the first lens element is a crescent-shaped lens convex to the object side.

12. The wide-angle lens system of claim 9, wherein the second lens element is a crescent-shaped lens convex to the image side opposite to the object side.

13. The wide-angle lens system of claim 9, wherein the first lens element is made of plastic.

14. The wide-angle lens system of claim 9, wherein the second lens element is made of plastic.

* * * * *